United States Patent
Cha et al.

(10) Patent No.: US 10,818,437 B2
(45) Date of Patent: Oct. 27, 2020

(54) MULTILAYER CERAMIC ELECTRONIC COMPONENT AND METHOD OF MANUFACTURING THE SAME

(71) Applicant: SAMSUNG ELECTRO-MECHANICS CO., LTD., Suwon-si, Gyeonggi-do (KR)

(72) Inventors: Kyoung Jin Cha, Suwon-si (KR); Hyung Soon Kwon, Suwon-si (KR); Ji Hong Jo, Suwon-si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 50 days.

(21) Appl. No.: 16/158,113

(22) Filed: Oct. 11, 2018

(65) Prior Publication Data

US 2020/0066452 A1 Feb. 27, 2020

(30) Foreign Application Priority Data

Aug. 23, 2018 (KR) .................. 10-2018-0098609

(51) Int. Cl.
*H01G 4/30* (2006.01)
*H01G 4/008* (2006.01)
*H01G 4/12* (2006.01)

(52) U.S. Cl.
CPC ............. *H01G 4/30* (2013.01); *H01G 4/008* (2013.01); *H01G 4/12* (2013.01)

(58) Field of Classification Search
CPC ............ H01G 4/30; H01G 4/008; H01G 4/12; H01G 4/012; H01G 4/1227; H01G 4/2325
See application file for complete search history.

(56) References Cited

U.S. PATENT DOCUMENTS

| 2013/0258551 A1* | 10/2013 | Kim | ........... H01G 4/12 |
| | | | 361/321.3 |
| 2013/0321980 A1* | 12/2013 | Suzuki | ........... H01G 4/008 |
| | | | 361/305 |
| 2016/0230026 A1 | 8/2016 | Furusawa | |

FOREIGN PATENT DOCUMENTS

| JP | 2004-221304 A | 8/2004 |
| JP | 2005-281712 A | 10/2005 |
| JP | 2018-104819 A | 7/2018 |
| KR | 10-0950127 B1 | 3/2010 |
| KR | 10-2013-0111752 A | 10/2013 |
| KR | 10-2013-0115357 A | 10/2013 |

(Continued)

OTHER PUBLICATIONS

Notice of Office Action dated Nov. 21, 2019 in Korean Patent Application No. 10-2018-0098609 (English translation).

*Primary Examiner* — Michael P McFadden
(74) *Attorney, Agent, or Firm* — Morgan, Lewis & Bockius LLP

(57) ABSTRACT

A method of manufacturing a multilayer ceramic electronic component includes preparing a ceramic green sheet, forming an internal electrode pattern by coating a paste for an internal electrode including a conductive powder including one or more of tungsten (W), molybdenum (Mo), chromium (Cr), and cobalt (Co), the sum of which is 1 to 20 wt %, and including tin (Sn), on the ceramic green sheet, forming a ceramic multilayer structure by stacking ceramic green sheets on which the internal electrode pattern is formed, and forming a body including a dielectric layer and an internal electrode by sintering the ceramic multilayer structure.

20 Claims, 4 Drawing Sheets

(56) References Cited

FOREIGN PATENT DOCUMENTS

KR 10-2016-0035094 A 3/2016
WO 2003/033752 A1 4/2003

* cited by examiner

'A'

MULTILAYER CERAMIC ELECTRONIC COMPONENT AND METHOD OF MANUFACTURING THE SAME

CROSS-REFERENCE TO RELATED APPLICATION(S)

This application claims the benefit of priority to Korean Patent Application No. 10-2018-0098609 filed on Aug. 23, 2018 in the Korean Intellectual Property Office, the disclosure of which is incorporated herein by reference in its entirety.

BACKGROUND

1. Field

The present disclosure relates to a multilayer ceramic electronic component and a method of manufacturing the same.

2. Description of Related Art

In general, an electronic component using a ceramic material, for example, a capacitor, an inductor, a piezoelectric element, a varistor, or a thermistor, includes a body formed of a ceramic material, an internal electrode formed in the body, and an external electrode installed on a surface of the body to be connected to the internal electrode.

A multilayer ceramic capacitor of a multilayer ceramic electronic component includes a plurality of stacked dielectric layers, internal electrodes disposed to face each other across the dielectric layer, and an external electrode that is electrically connected to the internal electrode.

A multilayer ceramic capacitor may be miniaturized and to have high specification and may be advantageously and easily installed and, thus, has been widely used as a component of a mobile communication device, such as a computer, a personal digital assistant (PDA), and a cellular phone.

Recently, along with high specification, and lightness, thinness, compactness, and smallness in electrical and electronic device industries, there has been a need for a miniaturized, high-capacity, and super high-capacity electronic components.

In particular, there is a need for a technology for maximizing capacitance per unit volume along with high capacity and miniaturization of a multilayer ceramic capacitor.

Accordingly, in the case of an internal electrode, high capacity needs to be embodied by minimizing a volume and increasing a stacking number while achieving a maximum area.

However, as an internal electrode is thinned, a ratio of a thickness to an area is lowered to increase sintering driving force and, thus, an increase in electrode disconnection and lumping becomes serious.

Accordingly, to embody a high-capacity multilayer ceramic capacitor, there is a need for a method of embodying a miniaturized and high-capacity multilayer ceramic capacitor with high reliability by preventing electrode disconnection and electrode lumping, which is a problem when a thinned internal electrode is formed.

SUMMARY

An aspect of the present disclosure may provide a method of manufacturing a multilayer ceramic electronic component, for a method of embodying a miniaturized and high-capacity multilayer ceramic capacitor with high reliability by preventing electrode disconnection and electrode lumping.

According to an aspect of the present disclosure, a method of manufacturing a multilayer ceramic electronic component may include preparing a ceramic green sheet, forming an internal electrode pattern by coating a paste for an internal electrode including a conductive powder including one or more of tungsten (W), molybdenum (Mo), chromium (Cr), and cobalt (Co), the sum of which is 1 to 20 wt %, based on a total weight of the conductive powder, and including tin (Sn), on the ceramic green sheet, forming a ceramic multilayer structure by stacking ceramic green sheets on which the internal electrode pattern is formed, and forming a body including a dielectric layer and an internal electrode by sintering the ceramic multilayer structure.

According to another aspect of the present disclosure, a multilayer ceramic electronic component manufactured using the method as described above may include a ceramic body including a dielectric layer and an internal electrode, and an external electrode disposed on the ceramic body, wherein the internal electrode includes a metallic crystal grain and a composite layer surrounding the metallic crystal grain and including one or more of tungsten (W), molybdenum (Mo), chromium (Cr), cobalt (Co), nickel (Ni) and tin (Sn).

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
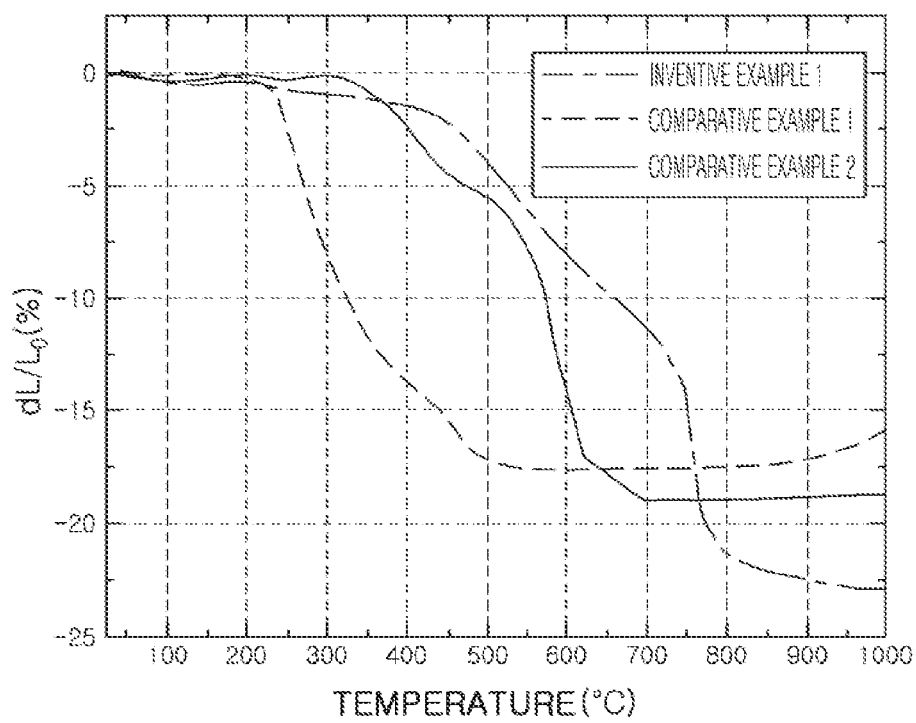
FIG. 1 is a graph showing a comparison of a thermal contraction behavior of an alloy of nickel (Ni) and tungsten (W) (Inventive Example 1), Ni powder without W (Comparative Example 1), and Ni powder including sulfur (S) of 2000 ppm (Comparative Example 2)

Hereinafter, exemplary embodiments of the present disclosure will now be described in detail with reference to the accompanying drawings.

In the drawings, an X direction may be defined as a first direction, an L direction, or a longitudinal direction, a Y direction may be defined as a second direction, a W direction, or a width direction, and a Z direction may be defined as a third direction, a T direction, or a thickness direction.

FIG. 1 is a graph showing a comparison of a thermal contraction behavior of an alloy of nickel (Ni) and tungsten (W) (Inventive Example 1), Ni powder without W (Comparative Example 1), and Ni powder including sulfur (S) of 2000 ppm (Comparative Example 2).

FIG. 2 is a schematic diagram illustrating a ceramic green sheet with an internal electrode pattern formed thereon.

Figure 3:
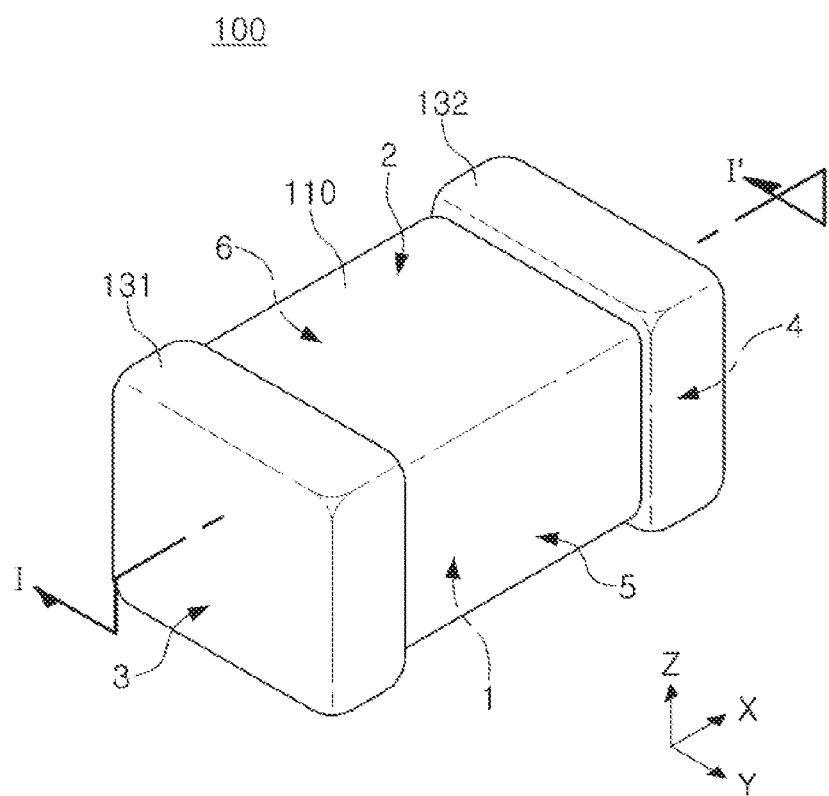
FIG. 3 is a schematic perspective view of a multilayer ceramic electronic component manufactured using a method of manufacturing a multilayer ceramic electronic component according to an exemplary embodiment of the present disclosure.

FIG. 3 is a schematic perspective view of a multilayer ceramic electronic component manufactured using a method of manufacturing a multilayer ceramic electronic component according to an exemplary embodiment of the present disclosure.

Figure 4:
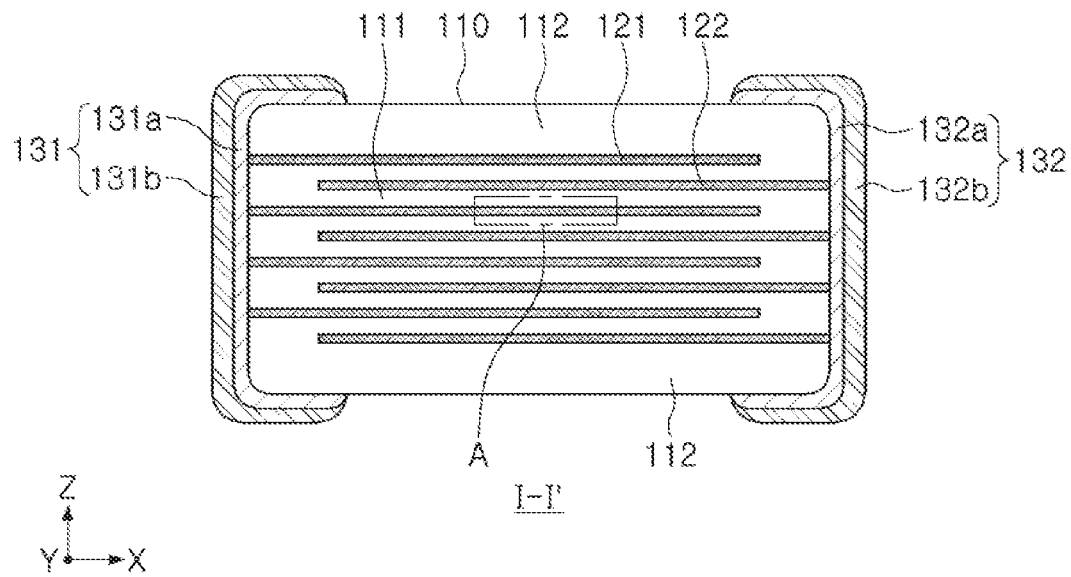
FIG. 4 is a cross-sectional view taken along a line I-I' of FIG. 3.

FIG. 4 is a cross-sectional view taken along a line I-I' of FIG. 3.

Figure 5:
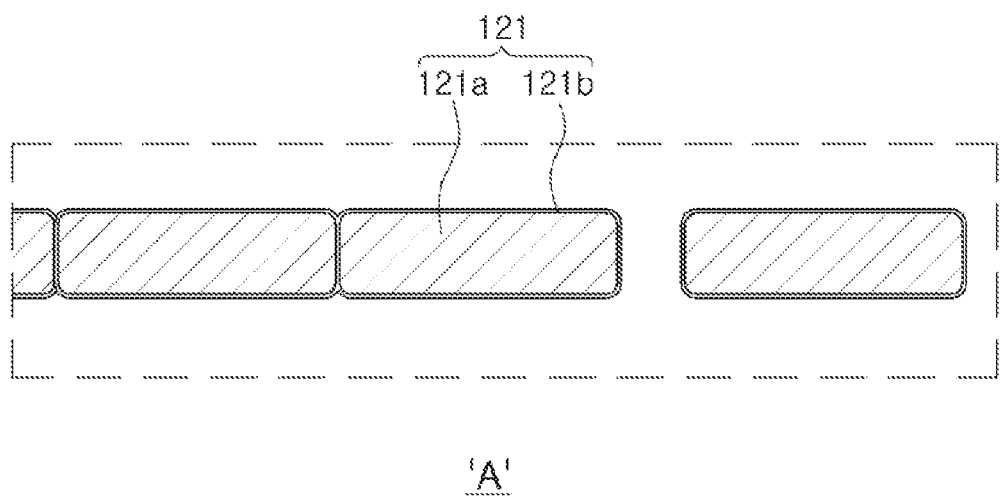
FIG. 5 is an enlarged view of a portion 'A' of FIG. 4.

FIG. 5 is an enlarged view of a portion 'A' of FIG. 4.

Hereinafter, a method of manufacturing a multilayer ceramic electronic component and a multilayer ceramic electronic component manufactured using the method according to an exemplary embodiment of the present disclosure are described in detail with reference to FIGS. 1 to 5.

Method of Manufacturing Multilayer Ceramic Electronic Component

A method of manufacturing a multilayer ceramic electronic component according to an exemplary embodiment of the present disclosure may include preparing a ceramic green sheet including ceramic powder, forming an internal electrode pattern by coating a paste for an internal electrode including a conductive powder including one or more of tungsten (W), molybdenum (Mo), chromium (Cr), and cobalt (Co), the sum of which is 1 to 20 wt %, based on a total weight of the conductive powder, and including tin (Sn), on the ceramic green sheet, forming a ceramic multilayer structure by stacking ceramic green sheets on which the internal electrode pattern is formed, and forming a body including a dielectric layer and an internal electrode by sintering the ceramic multilayer structure.

Preparing Ceramic Green Sheet

A ceramic green sheet including ceramic powder is prepared.

The ceramic green sheet may be prepared by mixing ceramic powder, a binder, and a solvent, and so on to prepare slurry and forming the slurry using doctor blade in the form a sheet with a thickness of several μm. Then, the ceramic green sheet may be sintered to form one dielectric layer 111 as shown in FIG. 4.

The ceramic green sheet may have a thickness equal to or less than 0.6 μm and, thus, the dielectric layer may have a thickness equal to or less than 0.4 μm after being sintered.

According to an exemplary embodiment of the present disclosure, even if a dielectric layer and an internal electrode are very thin, increase in electrode disconnection and lumping may be effectively prevented and, thus, a dielectric layer with a thickness equal to or less than 0.4 μm may be formed.

Forming Internal Electrode Pattern

An internal electrode pattern may be formed by coating the paste for the internal electrode including a conductive powder including one or more of tungsten (W), molybdenum (Mo), chromium (Cr), and cobalt (Co), the sum of which is 1 to 20 wt %, based on a total weight of the conductive powder, and including tin (Sn), on the ceramic green sheet.

The internal electrode pattern may be formed using a screen printing method or a Gravure printing method.

There may be various problems such as electrode disconnection and electrode lumping due to a sintering temperature difference between the internal electrode paste and the ceramic green sheet. In particular, as a thickness of the internal electrode is reduced, the probability that the problem occurs may be gradually increased.

To overcome the problem such as electrode disconnection and electrode lumping, a method of dispersing a material to delay sintering of a conductive powder has been developed but the material is a ceramic material that has degraded contact characteristics with a surface of Ni and, thus, restrictedly delays sintering at the initial stage of sintering and escapes to a dielectric layer to change the characteristics of a dielectric after sintering.

To embody sheet strength, some of used organic materials may remain as residual carbon (crystallized carbon) during plasticization to cause a problem such as electrode lumping and non-uniform sintering of a dielectric layer. The problem may be partially overcome by process optimization but it may be difficult to overcome the problem simply using process optimization along with thinning of an internal electrode and a dielectric layer.

According to an exemplary embodiment of the present disclosure, when one or more of W, Mo, Cr, and Co which are high melting point metal are added to a conductive powder, sintering of Ni at the initial stage of sintering may be delayed and, simultaneously, the metal may also be applied at high temperature in a next procedure to effectively prevent an electrode from being degraded and, after sintering, the metal may be present in the internal electrode without escaping to a dielectric layer and, thus, the characteristics of a dielectric are not changed.

When a conductive powder without Sn is used, there is a worry in that residual carbon (crystallized carbon) observed like a skein on an electrode surface is generated to cause a problem such as electrode lumping and non-uniform sintering of a dielectric layer but, according to an exemplary embodiment of the present disclosure, when the conductive powder includes Sn, residual carbon (crystallized carbon) may be prevented from being formed due to a function of a dehydrogenation catalyst of the conductive powder during plasticization.

Sn is barely solidified in Ni powder but has good wettability with a conductive powder and a low melting point and, thus, Sn may be thickened on a surface of Ni crystal grain of an internal electrode during a sintering procedure to form a composite layer including one or more of W, Mo, Cr, and Co, and Ni and Sn, thereby preventing a crystal grain from being grown and further enhancing an effect of delaying sintering of high melting point metal.

Accordingly, according to an exemplary embodiment of the present disclosure, increase in electrode disconnection and lumping may be prevented and, in particular, even if a dielectric layer and an internal electrode are very thin, an increase in the electrode disconnection and lumping may be effectively prevented.

As shown in FIG. 5, Sn is thickened on a surface of a crystal grain 121a of the internal electrode during a sintering procedure to form a composite layer 121b including one or more of W, Mo, Cr, and Co and Ni and Sn, thereby preventing a crystal grain from growing.

FIG. 1 is a graph showing comparison of a thermal contraction behavior of an alloy of nickel (Ni) and tungsten (W) (Inventive Example 1), Ni powder without W (Comparative Example 1), and Ni powder including sulfur (S) of 2000 ppm (Comparative Example 2). In Inventive Example 1, content of W is 10 wt % based on Ni powder.

As seen from FIG. 1, Comparative Example 1, Comparative Example 2, and Inventive Example 1 have 271° C., 476° C., and 525° C. as contraction temperature of −5%, respectively and, thus, Inventive Example 1 has an excellent thermal contraction behavior.

In this case, one or more of W, Mo, Cr, and Co, the sum of which is 1 to 20 wt %, based on a total weight of the conductive powder, may be included based on a conductive powder.

When the sum of one or more of W, Mo, Cr, and Co is less than 1 wt %, there is a worry about degraded electrode connection and, when the sum is greater than 20 wt %, the amount of metal in the form of oxide present at an interface between the internal electrode and the dielectric layer is increased and, thus, there is a worry about a degraded capacitance.

Content of Sn based on a conductive powder may be equal to or greater than 1.5 wt %, based on a total weight of the conductive powder.

When Sn content is less than 1.5 wt %, an effect of preventing residual carbon (crystallized carbon) or an effect of preventing a crystal grain from growing may be insufficient. It may not be required to particularly limit an upper limit of content of Sn based on a conductive powder but the upper limit of may be equal to or less than 4.0 wt %.

The conductive powder may include an alloy including tin (Sn) and at least one selected from the group of W, Mo, Cr, and Co.

When the conductive powder includes an alloy including tin (Sn) and at least one selected from the group of W, Mo, Cr, and Co, sintering may be delayed irrespective of dispersibility.

The conductive powder may further include an alloy including one or more of copper (Cu), silver (Ag), palladium (Pd), platinum (Pt), rhodium (Rh), iridium (Ir), and ruthenium (Ru).

The conductive power may include one or more of W, Mo, Cr, and Co and may include Sn in the form of a coating layer formed on a surface of the conductive powder.

When one or more of W, Mo, Cr, and Co and Sn are included in the form of a coating layer on the surface of the conductive powder, conductive powder particles may be prevented from contacting each other irrespective of dispersibility of a conductive powder to delay sintering.

The coating layer may further include one or more of Cu, Ag, Pd, Pt, Rh, Ir, and Ru.

The coating layer may be formed using an atomic layer deposition (ALD) process.

The atomic layer deposition (ALD) process is a technology of depositing a thin film or a passivation layer on a surface of a substrate during a semiconductor process and a technology of stacking atomic layers one by one unlike a conventional deposition technology of chemically covering a thin film. The atomic layer deposition (ALD) process advantageously has excellent step-coverage, easily adjusts a thickness of a thin film, and easily forms a uniform thin film.

The coating layer may be formed using an atomic layer deposition (ALD) process and, thus, a dense and uniform coating layer may be formed.

The paste for forming the internal electrode may further include sulfur (S) in an amount of 300 ppm or less (excluding 0) based on content of the conductive powder.

In general, a conductive paste for an internal electrode may include sulfur (S) in an amount of 300 ppm or less (excluding 0) based on content of the conductive that is a contraction retarder and, when content of S is greater than 300 ppm, there may be a worry in that a composite layer including one or more of W, Mo, Cr, and Co, and Ni and Sn is non-uniformly formed after being sintered.

The internal electrode pattern may have a thickness equal to or less than 0.5 μm and, thus, the internal electrode may have a thickness equal to or less than 0.4 μm after being sintered. According to an exemplary embodiment of the present disclosure, even if a dielectric layer and an internal electrode are very thin, increase in electrode disconnection and lumping may be effectively prevented and, thus, an internal electrode with a thickness equal to or less than 0.4 μm may be formed.

The conductive powder may be Ni powder with a higher melting point than Sn.

Forming Ceramic Multilayer Structure

Ceramic green sheets with internal electrode patterns formed thereon may be stacked to form a ceramic multilayer structure.

In this case, the ceramic multilayer structure may be pressurized and compressed in a stack direction.

Then, the ceramic multilayer structure may be cut for each region corresponding to one capacitor to form a chip.

Figure 2A:
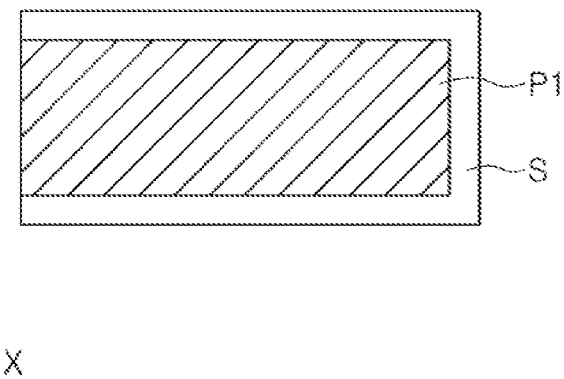
FIGS. 2A and 2B are schematic diagrams illustrating a ceramic green sheet with an internal electrode pattern formed thereon.
Figure 2B:
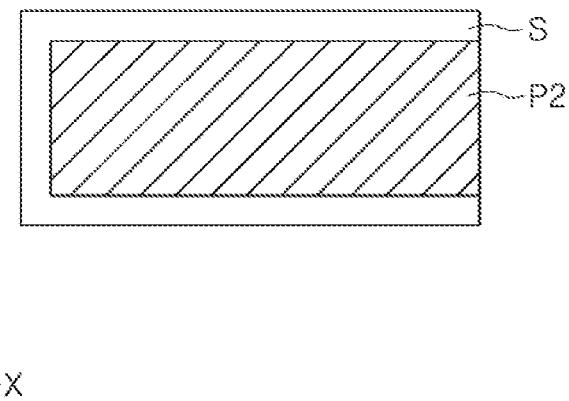

In this case, the ceramic multilayer structure may be cut to alternately expose ends of the internal electrode patterns through a lateral surface of the ceramic multilayer structure. Accordingly, as shown in FIGS. 2A and 2B, a ceramic green sheet (FIG. 2A) in which an internal electrode pattern P1 is formed as the first internal electrode 121 on a ceramic green sheet S after being sintered and a ceramic green sheet (FIG. 2B) in which an internal electrode pattern P2 is formed as the second internal electrode 122 on the ceramic green sheet S after being sintered may be alternately stacked.

Forming Body

The ceramic multilayer structure may be sintered to form a body including the dielectric layer and the internal electrode.

The sintering process may be performed in a reduction condition. The sintering process may be performed while adjusting a heating rate but the present disclosure not limited thereto and, in this case, the heating rate may be 30° C./60 s to 50° C./60 s at 700° C. or less.

Then, an external electrode may be formed to cover the lateral surface of the body and to be electrically connected to the internal electrode exposed through the lateral surface of the body. Then, a plating layer formed of Ni, Sn, or the like may be formed on a surface of the external electrode.

It may not be required to particularly limit a size of the body.

However, to simultaneously achieve miniaturization and high capacity, a dielectric layer and an internal electrode need to be thinned to increase a stack number, thereby remarkably enhancing an effect of preventing increase in electrode disconnection and lumping in a multilayer ceramic electronic component with a size equal to or less than 0402 (0.4 mm×0.2 mm) according to the present disclosure. Accordingly, the body may have a length equal to or less than 0.4 mm and a width equal to or less than 0.2 mm.

Multilayer Ceramic Electronic Component

A multilayer ceramic electronic component 100 manufactured using the aforementioned method of manufacturing a multilayer ceramic electronic component according to an exemplary embodiment of the present disclosure may include a body 110 including the dielectric layer 111 and the internal electrodes 121 and 122, and external electrodes 131 and 132 disposed on the body 110 and, in this case, the internal electrodes 121 and 122 may include the metallic crystal grain 121a and the composite layer 121b surrounding the metallic crystal grain 121a and including one or more of W, Mo, Cr, and Co, and Ni and Sn.

The body 110 may be configured in such a way that the dielectric layer 111 and the internal electrodes 121 and 122 are alternately stacked.

A detailed shape of the body 110 is not particularly limited but, as illustrated in the drawings, the body 110 may have a hexahedral shape or a similar shape thereto. Due to contraction of ceramic powder included in the body 110 during a sintering procedure, the body 110 may have a substantially hexahedral shape but not a hexahedral shape with a complete straight line.

The body 110 may include first and second surfaces 1 and 2 facing each other in the thickness direction (the Z direction), third and fourth surfaces 3 and 4 connected to the first and second surfaces 1 and 2 and facing each other in the width direction (the Y direction), and fifth and sixth surfaces 5 and 6 connected to the first and second surfaces 1 and 2, connected to the third and fourth surfaces 3 and 4, and facing each other in the longitudinal direction (the X direction).

The plurality of dielectric layers 111 forming the body 110 may be in a sintered state and may be integrated into each other in such a way that it is difficult to check a boundary between adjacent dielectric layers 111 without use of a scanning electron microscope (SEM).

A material of the dielectric layer 111 is not particularly limited as long as sufficient capacitance is acquirable and may be, for example, barium titanate ($BaTiO_3$) powder. A material for forming the dielectric layer 111 may be formed by adding various ceramic additives, organic solvents, plasticizers, bonding agents, dispersants, or the like to powder such as barium titanate ($BaTiO_3$) according to the objective of the present disclosure.

The capacitor body 110 may include a cover layer 112 that is formed at each of upper and lower portions thereof, that is, at opposite end portions in the thickness direction (the Z direction) thereof and is formed by stacking dielectric layers without an internal electrode. The cover layer 112 may maintain the reliability of a capacitor with respect to external shocks.

It may not be required to particularly limit the thickness of the cover layer 112. However, to easily achieve miniaturization and high capacity of a capacitor component, the cover layer 112 may have a thickness equal to or less than 20 μm.

It may not be required to particularly limit a thickness of the dielectric layer 111.

However, according to the present disclosure, even if the dielectric layer and the internal electrode are very thin, an increase in electrode disconnection and lumping may be effectively present and, thus, the dielectric layer 111 may have a thickness equal to or less than 0.4 μm to easily achieve miniaturization and high capacity of a capacitor component.

The thickness of the dielectric layer 111 may refer to an average thickness of the dielectric layers 111 disposed between the first and second internal electrodes 121 and 122.

The average thickness of the dielectric layers 111 may be measured by scanning an image of a section of the body 110 in a length-thickness (L-T) direction using a scanning electron microscope (SEM).

For example, with regard to arbitrary dielectric layer extracted from the image of the section in the length-thickness (L-T) direction of the body 110, which is cut at a central portion of a width direction of the body 110 and is scanned using a scanning electronic microscope (SEM), thicknesses may be measured at 30 points spaced apart at equidistant intervals in the longitudinal direction to measure an average value.

The thicknesses may be measured at the 30 points spaced apart at equidistant intervals, which refers to a capacity formation portion at which the first and second internal electrodes 121 and 122 overlap with each other.

Then, the internal electrodes 121 and 122 and a dielectric layer may be alternately stacked and may include the first and second internal electrodes 121 and 122. The first and second internal electrodes 121 and 122 may be alternately disposed to face each other across the dielectric layer 111 configuring the body 110 and may be exposed through the third and fourth surfaces 3 and 4 of the body 110, respectively.

In this case, the first and second internal electrodes 121 and 122 may be electrically separated from each other by the dielectric layer 111 disposed therebetween.

The conductive paste may be printed using a screen printing method, a Gravure printing method, or the like but the present disclosure is not limited thereto.

Hereinafter, the first internal electrode 121 is described with reference to FIG. 5, which may be applied to the second electrode 122 in the same way.

The first internal electrode 121 may include the metallic crystal grain 121a, and the composite layer 121b surrounding the metallic crystal grain 121a and including one or more of W, Mo, Cr, and Co, and Ni and Sn.

The metallic crystal grain 121a may be formed like a polyhedron made by uniformly arranging metallic atoms. The composite layer 121b including one or more of W, Mo, Cr, and Co, and Ni and Sn may surround the metallic crystal grain 121a. That is, the composite layer 121b including one or more of W, Mo, Cr, and Co, and Ni and Sn may be present at a metal grain boundary. The composite layer 121b including one or more of W, Mo, Cr, and Co, and Ni and Sn may prevent the metallic crystal grain 121a from growing outward to prevent internal electrode disconnection and to prevent internal electrode lumping.

The composite layer 121b including one or more of W, Mo, Cr, and Co, and Ni and Sn may almost completely surround at least one metallic crystal grain 121a.

Since Sn has a low melting point, Sn may be thickened on a surface of a crystal grain of an internal electrode during a sintering procedure and may be uniformly distributed on an entire area of the composite layer 121b and one or more of W, Mo, Cr, and Co which are high melting point metal may be dispersed in the composite layer 121b.

When a ratio of a length of a portion on which the internal electrode is actually formed to an entire length of the internal electrode 121 is defined as connectivity C of the internal electrode, the composite layer 121b including one or more of W, Mo, Cr, and Co, and Ni and Sn may prevent the metallic crystal grain 121a from growing outward and, thus, the internal electrode 121 may satisfy 85%≤C.

The composite layer 121b including one or more of W, Mo, Cr, and Co, and Ni and Sn may have a thickness of 1 to 15 nm.

When the thickness of the composite layer 121b including one or more of W, Mo, Cr, and Co, and Ni and Sn is less than 1 nm, a metal crystal grain may not be sufficiently prevented from growing outward and, when the thickness is greater than 15 nm, the thickness of the composite layer 121b including one or more of W, Mo, Cr, and Co, and Ni and Sn may not be uniform and, thus, an effect of preventing the metal crystal grain from growing outward may be degraded.

The metallic crystal grain 121a may be a Ni crystal grain.

It may not be required to particularly limit a thickness of the first and second internal electrodes 121 and 122.

However, even if a dielectric layer and an internal electrode are very thin, increase in electrode disconnection and lumping may be effectively prevented and, thus, the first and second internal electrodes 121 and 122 may have a thickness equal to or less than 0.4 µm to easily achieve miniaturization and high capacity of a capacitor component.

The thickness of the first and second internal electrodes 121 and 122 may refer to an average thickness of the first and second internal electrodes 121 and 122.

The average thickness of the first and second internal electrodes 121 and 122 may be measured by scanning an image of a section of the body 110 in a length-thickness (L-T) direction using a scanning electron microscope (SEM).

For example, with regard to arbitrary first and second internal electrodes 121 and 122 extracted from the image of the section in the length-thickness (L-T) direction of the body 110, which is cut at a central portion of a width direction of the body 110 and is scanned using a scanning electronic microscope (SEM), thicknesses may be measured at 30 points spaced apart at equidistant intervals in the longitudinal direction to measure an average value.

The thicknesses may be measured at the 30 points spaced apart at equidistant intervals that is a capacity formation portion at which the first and second internal electrodes 121 and 122 overlap with each other.

The external electrodes 131 and 132 may be disposed in the body 110 and may be connected to the internal electrodes 121 and 122. As shown in FIG. 4, the capacitor component 100 may include the first and second internal electrodes 121 and 122 and the first and second external electrodes 131 and 132 connected thereto, respectively. According to the present embodiment, although the structure in which the capacitor component 100 includes two external electrodes 131 and 132 is described, the number, the shape, or the like of the external electrodes 131 and 132 may be changed depending on a shape of the internal electrodes 121 and 122 or other objectives.

The external electrodes 131 and 132 may be formed of any material as long as the material has electrical conductivity, such as metal, a detailed material may be determined in consideration of electrical characteristics, structural stability, and so on, and the external electrodes 131 and 132 may have a multi-layered structure.

For example, the external electrodes 131 and 132 may include electrode layers 131a and 132a disposed in the body 110 and plating layers 131b and 132b formed on the electrode layers 131a and 132a.

As a more detailed example of the electrode layers 131a and 132a, the electrode layers 131a and 132a may be a sintered electrode including conductive metal and glass and, in this case, the conductive metal may be Cu. In addition, the electrode layers 131a and 132a may be a resin-based electrode including a plurality of metallic particles and conductive resin.

As a more detailed example of the plating layers 131b and 132b, the plating layers 131b and 132b may be an Ni plating layer or an Sn plating layer, may be formed in such a way that an Ni plating layer and an Sn plating layer are sequentially formed on the electrode layers 131a and 132a, or may include a plurality of Ni plating layers and/or a plurality of Sn plating layers.

It may not be required to particularly limit a size of the multilayer ceramic electronic component.

However, to simultaneously achieve miniaturization and high capacity, a thickness of a dielectric layer and an internal electrode needs to be reduced and a stack number needs to be increased, thereby remarkably enhancing an effect of preventing increase in electrode disconnection and lumping according to the present disclosure in a multilayer ceramic electronic component with a size equal to or less than 0402 (0.4 mm×0.2 mm). Accordingly, the multilayer ceramic electronic component may have a length equal to or less than 0.4 mm and a width equal to or less than 0.2 mm. In the multilayer ceramic electronic component, a ratio of a length of a portion on which an internal electrode is actually formed to an entire length of the internal electrode may be greater than or equal to 85%.

As set forth above, according to the present disclosure, a paste for an internal electrode including a conductive powder including one or more of W, Mo, Cr, and Co, the sum of which is 1 to 20 wt %, based on a total weight of the conductive powder, and including Sn is used and, thus, internal electrode lumping and internal electrode disconnection may be prevented.

While exemplary embodiments have been shown and described above, it will be apparent to those skilled in the art that modifications and variations could be made without departing from the scope of the present disclosure as defined by the appended claims.

What is claimed is:

1. A method of manufacturing a multilayer ceramic electronic component, the method comprising:
   preparing a ceramic green sheet;
   forming an internal electrode pattern by coating a paste for an internal electrode including a conductive powder including at least one selected from the group of tungsten (W), molybdenum (Mo), chromium (Cr), and cobalt (Co), the sum of which is 1 to 20 wt %, based on a total weight of the conductive powder, and including tin (Sn), on the ceramic green sheet;
   forming a ceramic multilayer structure by stacking ceramic green sheets on which the internal electrode pattern is formed; and
   forming a body including a dielectric layer and an internal electrode by sintering the ceramic multilayer structure.

2. The method of claim 1, wherein the ceramic green sheet has a thickness equal to or less than 0.6 µm and the internal electrode pattern has a thickness equal to or less than 0.5 µm.

3. The method of claim 1, wherein Sn is provided in an amount of 1.5 wt % or more, based on a total weight of the conductive powder.

4. The method of claim 1, wherein the conductive powder includes an alloy including tin (Sn) and at least one selected from the group of tungsten (W), molybdenum (Mo), chromium (Cr), cobalt (Co).

5. The method of claim 4, wherein the conductive powder further includes an alloy including at least one selected from the group of copper (Cu), silver (Ag), palladium (Pd), platinum (Pt), rhodium (Rh), iridium (Ir), and ruthenium (Ru).

6. The method of claim 1, wherein the conductive powder includes a coating layer, and the coating layer is formed on the surface of the conductive powder, and the coating layer includes at least one selected from the group of tungsten (W), molybdenum (Mo), chromium (Cr), and cobalt (Co), and tin (Sn).

7. The method of claim 6, wherein the coating layer further includes at least one selected from the group of copper (Cu), silver (Ag), palladium (Pd), platinum (Pt), rhodium (Rh), iridium (Ir), and ruthenium (Ru).

8. The method of claim 6, wherein the coating layer is formed using an atomic layer deposition (ALD) process.

9. The method of claim 1, wherein the conductive powder further includes sulfur (S) in an amount of 300 ppm or less (excluding 0) based on a total content of the conductive powder.

10. The method of claim 1, wherein the conductive powder is nickel (Ni) powder.

11. The method of claim 1, wherein the body has a length equal to or less than 0.4 mm and a width equal to or less than 0.2 mm.

12. A multilayer ceramic electronic component manufactured using the method of claim 1, comprising:
   a ceramic body including a dielectric layer and an internal electrode; and
   an external electrode disposed on the ceramic body,
   wherein the internal electrode includes a metallic crystal grain and a composite layer surrounding the metallic crystal grain, and the composite layer includes at least one selected from the group of tungsten (W), molybdenum (Mo), chromium (Cr), and cobalt (Co), and nickel (Ni) and tin (Sn).

13. The multilayer ceramic electronic component of claim 12, wherein the dielectric layer has a thickness equal to or less than 0.4 µm and the internal electrode has a thickness equal to or less than 0.4 µm.

14. The multilayer ceramic electronic component of claim 12, wherein the composite layer has a thickness within a range from 1 to 15 nm.

15. The multilayer ceramic electronic component of claim 12, wherein the metallic crystal grain is a nickel (Ni) crystal grain.

16. The multilayer ceramic electronic component of claim 12, wherein 85%≤C, where C is a ratio of a length of a portion on which an internal electrode is actually formed to an entire length of the internal electrode.

17. A method of manufacturing a multilayer ceramic electronic component, the method comprising:
   preparing a ceramic green sheet;
   forming an internal electrode pattern by coating a paste for an internal electrode including a conductive powder including at least one selected from the group of tungsten (W), molybdenum (Mo), chromium (Cr), and cobalt (Co), and including tin (Sn) in a content of 1.5 wt % or more, based on a total weight of the conductive powder, on the ceramic green sheet;
   forming a ceramic multilayer structure by stacking ceramic green sheets on which the internal electrode pattern is formed; and
   forming a body including a dielectric layer and an internal electrode by sintering the ceramic multilayer structure.

18. The method of claim 17, wherein the ceramic green sheet has a thickness equal to or less than 0.6 µm and the internal electrode pattern has a thickness equal to or less than 0.5 µm.

19. The method of claim 17, wherein the conductive powder includes an alloy including tin (Sn) and at least one selected from the group of tungsten (W), molybdenum (Mo), chromium (Cr), cobalt (Co).

20. The method of claim 19, wherein the conductive powder further includes an alloy including at least one selected from the group of copper (Cu), silver (Ag), palladium (Pd), platinum (Pt), rhodium (Rh), iridium (Ir), and ruthenium (Ru).

* * * * *